United States Patent [19]

Engelhardt et al.

[11] Patent Number: 5,793,450
[45] Date of Patent: Aug. 11, 1998

[54] CANOPY TRANSMITTAL REFLECTANCE CONTROL AND INFORMATION DISPLAY

[75] Inventors: Michel Engelhardt, Woodbury; John M. Schiavone, Brooklyn, both of N.Y.

[73] Assignee: Grumman Aerospace Corporation, Los Angeles, Calif.

[21] Appl. No.: 337,649

[22] Filed: Nov. 10, 1994

[51] Int. Cl.[6] ............................................. G02F 1/1335
[52] U.S. Cl. ............................................ 349/16; 359/630
[58] Field of Search ...................... 359/630, 51; 345/7

[56] References Cited

U.S. PATENT DOCUMENTS

| | | | |
|---|---|---|---|
| 3,915,548 | 10/1975 | Opittek et al. | 350/3.5 |
| 4,181,405 | 1/1980 | Cohen | 350/331 |
| 4,185,895 | 1/1980 | Stephens et al. | 350/345 |
| 4,218,111 | 8/1980 | Withrington et al. | 350/3.72 |
| 4,261,647 | 4/1981 | Ellis | 350/174 |
| 4,600,271 | 7/1986 | Boyer et al. | 350/174 |
| 4,710,766 | 12/1987 | Dubois et al. | 340/784 |
| 4,749,261 | 6/1988 | McLaughlin et al. | 350/339 |
| 4,808,978 | 2/1989 | Vernay | 340/705 |
| 4,884,135 | 11/1989 | Schiffman | 345/7 |
| 4,900,133 | 2/1990 | Berman | 359/630 |
| 4,988,976 | 1/1991 | Lu | 359/630 |
| 4,993,788 | 2/1991 | Steward | 350/3.72 |
| 4,998,784 | 3/1991 | Freeman et al. | 359/630 |
| 5,015,083 | 5/1991 | Wurst et al. | 359/630 |
| 5,037,166 | 8/1991 | Malcolm et al. | 359/15 |
| 5,057,744 | 10/1991 | Barbier et al. | 315/10 |
| 5,072,218 | 12/1991 | Spero et al. | 340/980 |
| 5,343,313 | 8/1994 | Fergason | 359/630 |

FOREIGN PATENT DOCUMENTS

| | | | |
|---|---|---|---|
| 4127656 | 2/1993 | Germany | 345/7 |
| 6-144083 | 5/1994 | Japan | 345/7 |

Primary Examiner—William L. Sikes
Assistant Examiner—Charles Miller
Attorney, Agent, or Firm—Terry J. Anderson; Karl J. Hoch, Jr.

[57] ABSTRACT

A system for controlling the transmittance of electromagnetic energy through an aircraft cockpit canopy, and more particularly a canopy panel structure incorporating selectively energizable liquid crystals therein for controlling the transmittance of the electromagnetic energy and/or for integrating an information display in the canopy panel structure. Also disclosed is a method for controlling the transmittance of electromagnetic energy through an aircraft cockpit canopy utilizing a liquid crystal arrangement which is incorporated into the canopy panel structure.

2 Claims, 3 Drawing Sheets

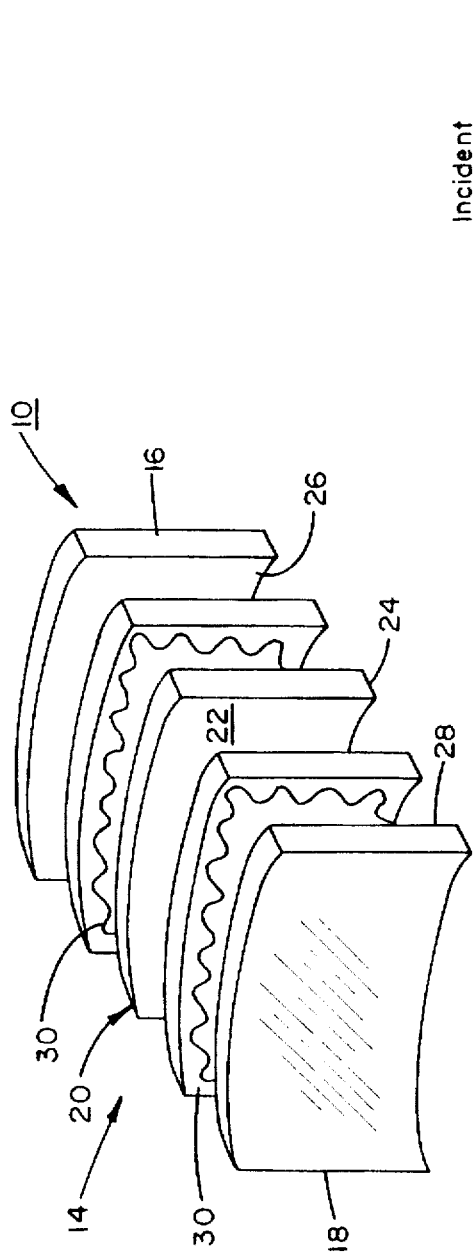
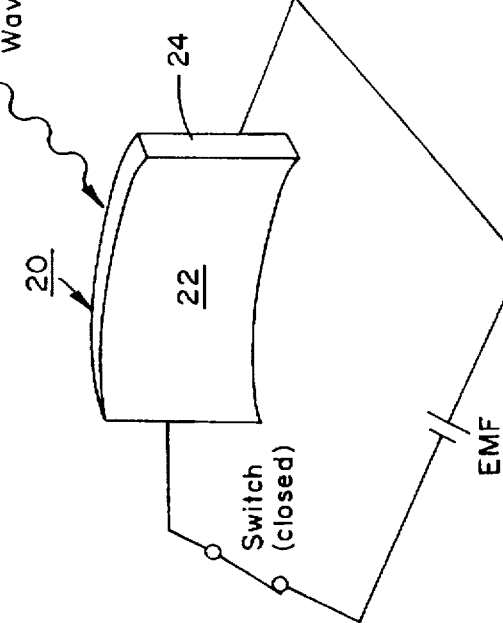
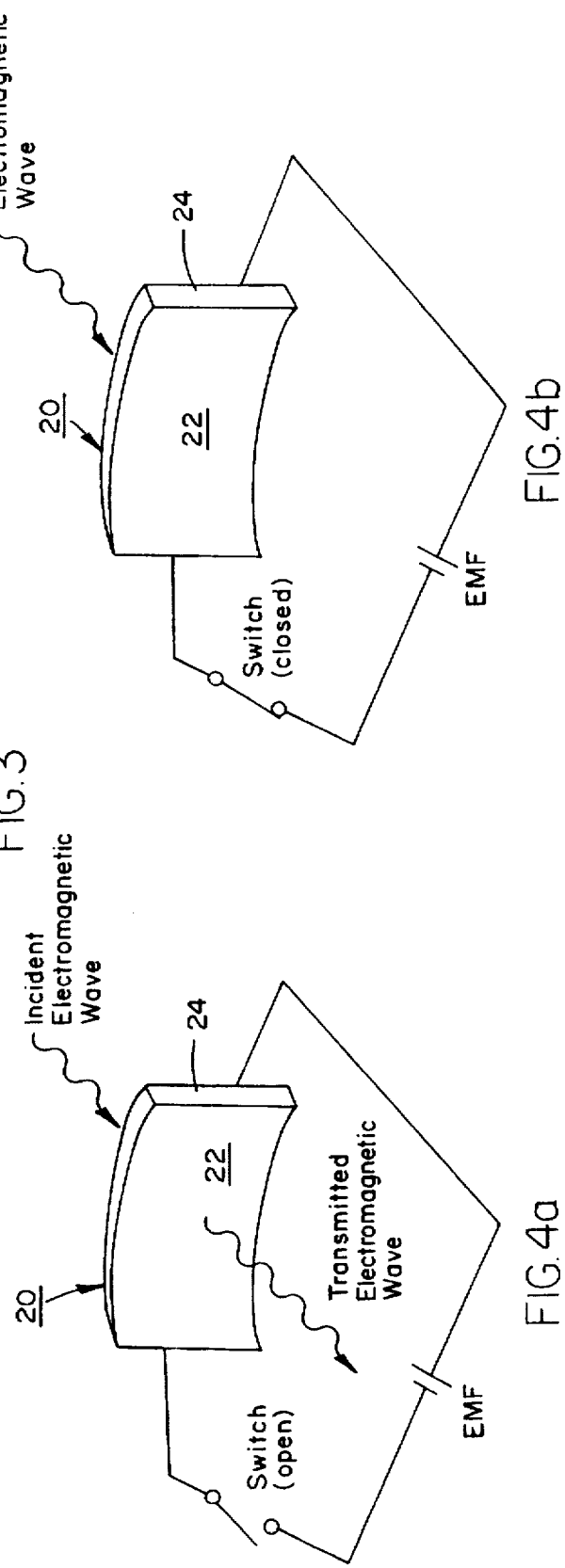

CANOPY TRANSMITTAL REFLECTANCE CONTROL AND INFORMATION DISPLAY

BACKGROUND OF THE INVENTION

1. Field of the Invention

The present invention relates to a system for controlling the transmittance of electromagnetic energy through an aircraft cockpit canopy, and more particularly relates to the provision of a canopy panel structure incorporating liquid crystals therein for controlling the transmittance of the electromagnetic energy and/or for integrating an information display in the canopy panel structure. Moreover, the invention is also directed to a method for controlling the transmittance of electromagnetic energy through an aircraft cockpit canopy utilizing a liquid crystal arrangement which is incorporated into the canopy panel structure.

During the operation of various types of aircraft and particularly under conditions of powered aircraft flight to which aircraft are normally subjected, especially such as high-performance military aircraft combat conditions, it is desirable and of potentially critical importance to be able to control radiant energy which is transmitted through and reflected from aircraft canopies. Currently developed, highly sophisticated, electro-optical weapons, which may operate in passive modes and incorporate ultraviolet, visual and infrared homing systems, can readily detect and are able to track solar glints or reflected light emanating from the helmet of an aircraft pilot, as well as from the aircraft cockpit canopies. Moreover, laser weapons directed against aircraft also represent a threat to aircraft pilots, especially because of the ability of these weapons to cause eye damage to the pilots, thereby adversely affecting the efficacy of aircraft performance and the safety of the aircraft and pilot and any other personnel on board.

In addition to the foregoing, solar heat loads which are encountered in aircraft cabins or cockpits are normally controlled through onboard heat exchanger devices which dissipate the generated thermal heat loads to the surroundings or environment. Frequently, these heat exchanger devices are not optimally integrated into aircraft structures, particularly with regard to signature management, causing the exhaust from the heat exchangers to be dissipated over the skin of the aircraft. The resultant hot spots can be readily detected by infrared systems, again exposing the aircraft to danger from external attacks. The present invention clearly enables a reduction in such hot spots by lowering the thermal dissipation to the environment produced by the aircraft heat exchangers.

At this time, the panels or windows of aircraft canopies normally possess transparencies which enable electromagnetic energy to be reflected and readily transmitted therethrough, whereby such incident externally-generated electromagnetic energy, for instance, possibly caused or projected against the aircraft by hostile weapon systems, exposes the pilot and the aircraft to considerable degrees of danger with potentially fatal results.

2. Discussion of the Prior Art

Although various structures have been developed in different technologies incorporating liquid crystals into multi-layered panel or window arrangements, none of these are concerned with the provision of aircraft canopies incorporating liquid crystal layers or liquid crystals embedded in film webs to protect the pilot and the aircraft from externally generated electromagnetic energy due to hostile action, and also to be able to concurrently provide a screen or information display arrangement which is integrated into the cockpit canopy panel structure, thereby imparting a dual advantageous effect to the foregoing.

McLaughlin et al. U.S. Pat. No. 4,749,261 discloses shatter-proof liquid crystal panel wherein a liquid crystal-containing layer or material is interposed between inner and outer layers of a transparent material; for instance, in the construction of a roof panel, side windows or partition for an automobile, and whereby the liquid crystals may be selectively activated through energization and resultant orientation by means of the application of an electrical current so as to cause the panel structure to assume different desired degrees of opaqueness or transparency in order to either screen out or permit the passage therethrough of light.

Ellis U.S. Pat. No. 4,261,647 discloses an aircraft canopy and cockpit construction whereby a head-up display located in the cockpit cabin incorporates a liquid crystal structure to provide an information display screen arrangement for the pilot.

Boyer et al. U.S. Pat. No. 4,600,271 discloses a head-up display utilized in aircraft cockpits including liquid crystals adapted to be selectively activated to provide an information screen for a pilot.

Similarly, Withrington et al. U.S. Pat. No. 4,218,111; Dubois et al. U.S. Pat. No. 4,710,766; and Opittek et al. U.S. Pat. No. 3,915,548 all disclose various structures which are adapted to be employed in aircraft cockpits and incorporate liquid crystal displays.

However, none of the foregoing liquid crystal applications and systems are directed to integrating the liquid crystals directly into an aircraft cockpit canopy panel structure.

SUMMARY OF THE INVENTION

Accordingly, in order to control the amount of transmittance of electromagnetic energy through an aircraft cockpit canopy pursuant to the concept of the present invention, the generally transparent cockpit panel or window structure is constituted of a laminated or sandwich construction, whereby a layer or film web incorporating liquid crystals over a surface area or areas thereof will enable the obtention of selectively either a transparent or an opaque canopy depending upon a deactivation or activation of the liquid crystals through the application thereto of an exciting electrical current, thereby producing a change in the orientations of the liquid crystals resulting in either an opaque or non-transparent canopy surface depending upon the mode of operation of the aircraft by the pilot. When deactivated, such as by reducing or eliminating the electrical current imparted to the liquid crystals, the latter again change their orientations, and the canopy resultingly becomes transparent and facilitates the passage therethrough of electromagnetic energy. This enables the pilot to assume the capability of selectively putting the canopy on a so-called "crystal activation" so as to thereby render the canopy opaque, or alternatively, to employ "crystal deactivation" rendering the canopy transparent, depending upon the intended mission of the aircraft and potential exposure thereof to hostile action.

In more recent years, the integration into aircraft, especially although not necessarily into high-performance military aircraft, of "night vision" equipment, such as low or subdued light, television cameras and electro-optical systems (infrared search and track and forward look and eye are systems), has reduced the need for an aircraft pilot to see through his cockpit canopy. The liquid crystals which are embedded in the layer or film web which is interposed between the transparent inner and outer cockpit panels are able to controllably diminish the transmittance therethrough of environmentally-generated and man-made energies, such as electromagnetic energy, thereby clearly reducing the susceptibility and vulnerability of the pilot and of the aircraft to external hostile influences, as well as minimizing the effects of solar impact on the cockpit. This liquid crystal structure provides a safety arrangement or system against external electromagnetic energy which is directed against the aircraft and its cockpit, and clearly enhances the degree of safety by the pilot with regard to hostile actions directed against him and the aircraft he is piloting.

Pursuant to another aspect of the invention, the liquid crystals which are embedded within the canopy panel structure are adapted to form a screen which is able to display theater-of-operation or other information, such as head-up information (HUD) to a pilot of the aircraft, thereby reducing expenditure of equipment which has to be installed in the cockpit, and also concurrently facilitating an improved panoramic or unrestricted forward view for the pilot of the aircraft.

Accordingly, it is an object of the present invention to provide an aircraft canopy having transparent panels and possessing liquid crystals integrated therein, and wherein the liquid crystals may be selectively electrically energized to produce an either opaque or transparent energy-transmitting canopy structure.

Another object of the present invention resides in the provision of an aircraft cockpit canopy structure incorporating a liquid crystal arrangement whereby the transmittance of electromagnetic energy therethrough is selectively controlled by activating or energizing the liquid crystals over a controlled panel surface area or areas of the canopy.

Still another object of the present invention is to provide a liquid crystal arrangement integrated in an aircraft canopy structure which will reduce solar reflections of the visible and near infrared portions of the electromagnetic spectrum from the aircraft canopy and the helmet of a pilot flying the aircraft.

Yet another object of the present invention is to provide a liquid crystal system for controlling the transmittance of electromagnetic energy through an aircraft canopy, and whereby there is reduced the solar thermal loading of the aircraft cabin which will resultingly reduce any heat load transmitted to the environmental control system of the aircraft.

A further object of the present invention is to provide a liquid crystal aircraft canopy system as described herein which will impart protection to the pilot in the aircraft against hostile actions from external laser weapons, and to transfer laser energies from such weapons which are directed against the aircraft canopy into a signal to the pilot along with coordinates representative of the incoming laser radiation.

Yet another object of the present invention resides in the provision of a cockpit canopy for an aircraft which includes transparent panel structure having liquid crystals embedded therein and which are activatable for forming a screen for suitably displaying to a pilot of the aircraft theater-of-operation or other suitable information directly within surface areas of the liquid crystal-containing aircraft canopy.

Furthermore, another object of the present invention is to provide a method of controlling the transmittance of electromagnetic energy through an aircraft canopy utilizing the liquid crystal system as described herein.

BRIEF DESCRIPTION OF THE DRAWINGS

Reference may now be had to the following detailed description of an exemplary embodiment of a liquid crystal panel system for controlling electromagnetic transmittance through an aircraft cockpit canopy, having reference to the accompanying drawings; in which:

FIG. 3 illustrates a perspective exploded view of a cockpit window or panel structure showing the liquid crystals integrated therein;

FIG. 4a illustrates a detailed perspective view of the activation of a liquid crystal film contained in the cockpit canopy structure; and FIG. 4b illustrates a view similar to FIG. 4a showing the liquid crystal film in a deactivated state.

DETAILED DESCRIPTION

Figure 1:
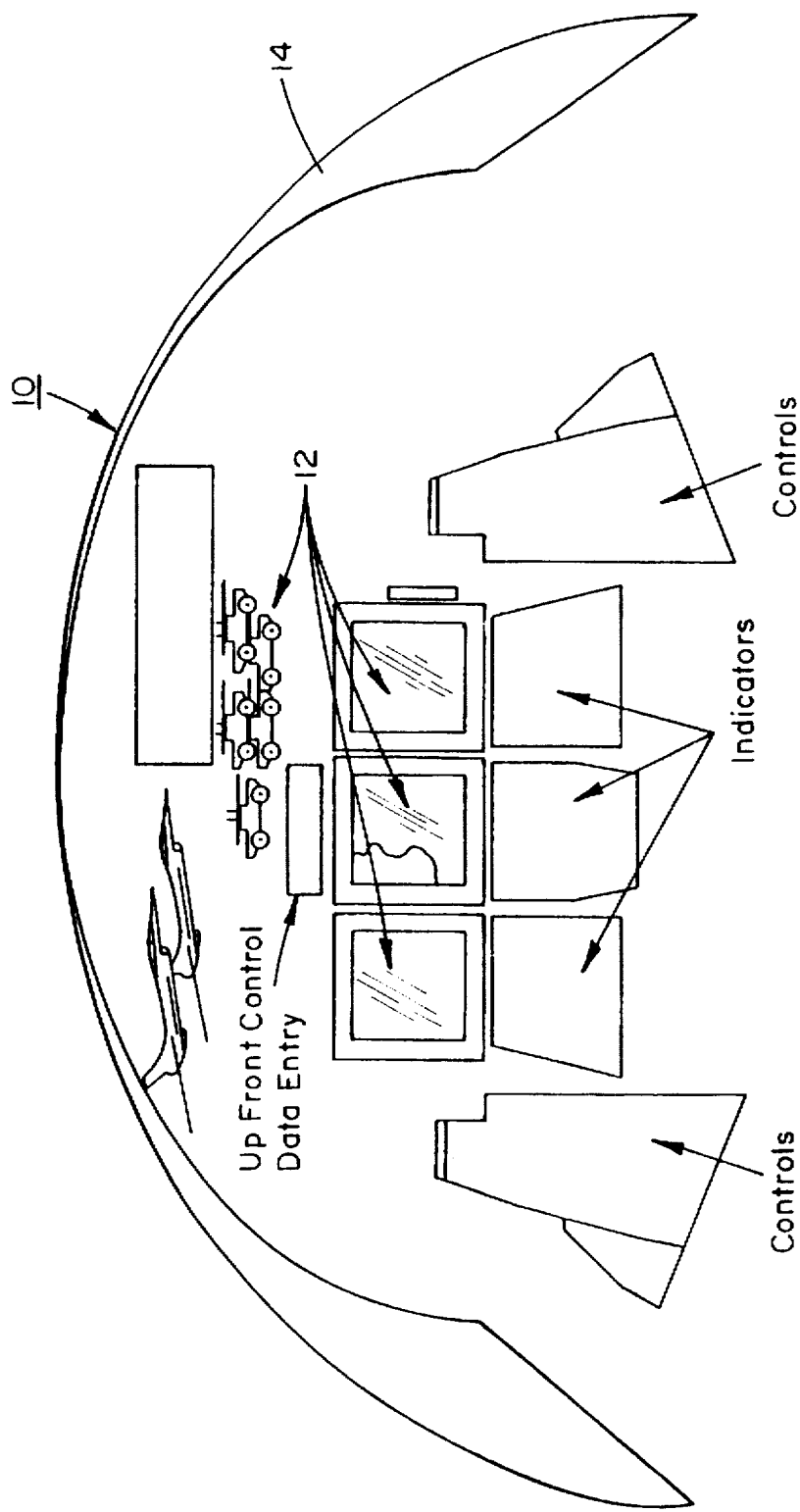
FIG. 1 illustrates, generally diagrammatically, the interior view of an aircraft canopy incorporating an integrated head-up display.

Referring now in detail to the drawings, and specifically to FIG. 1, there is diagrammatically disclosed a cockpit canopy 10 of an aircraft, which, for example, may be a high-performance military combat aircraft or any type of aircraft, such as a transport plane or helicopter, which could be subjected to terrorist attacks or which is to be deployed in a combat or war zone.

The cockpit canopy 10 may be of a construction which incorporates a suitable display 12, such as a theater-of-operation or head-up (HUD) display as an integral component of the canopy panel or window surface 14 and which may comprise large interactive color displays and upfront control data entry displays providing information to the pilot.

The displays may be acted upon through the energizing of suitable liquid crystals which are integrated into the canopy over specified surface areas, and which may be on or embedded in a substrate in the form of a film web interposed between outer and inner transparent canopy surface panels, as described in further detail hereinbelow with regard to FIGS. 3 and 4 of the drawings.

In essence, the arrangement for controlling the transmittance of electromagnetic energy through the canopy 10 is controlled through the activation or energizing of the interposed layer of liquid crystals in the panels so as to render the canopy either opaque or transparent as may be desired by the pilot and in correlation with specifically encountered flight conditions and external electromagnetic energy which may be directed against the canopy.

Figure 2:
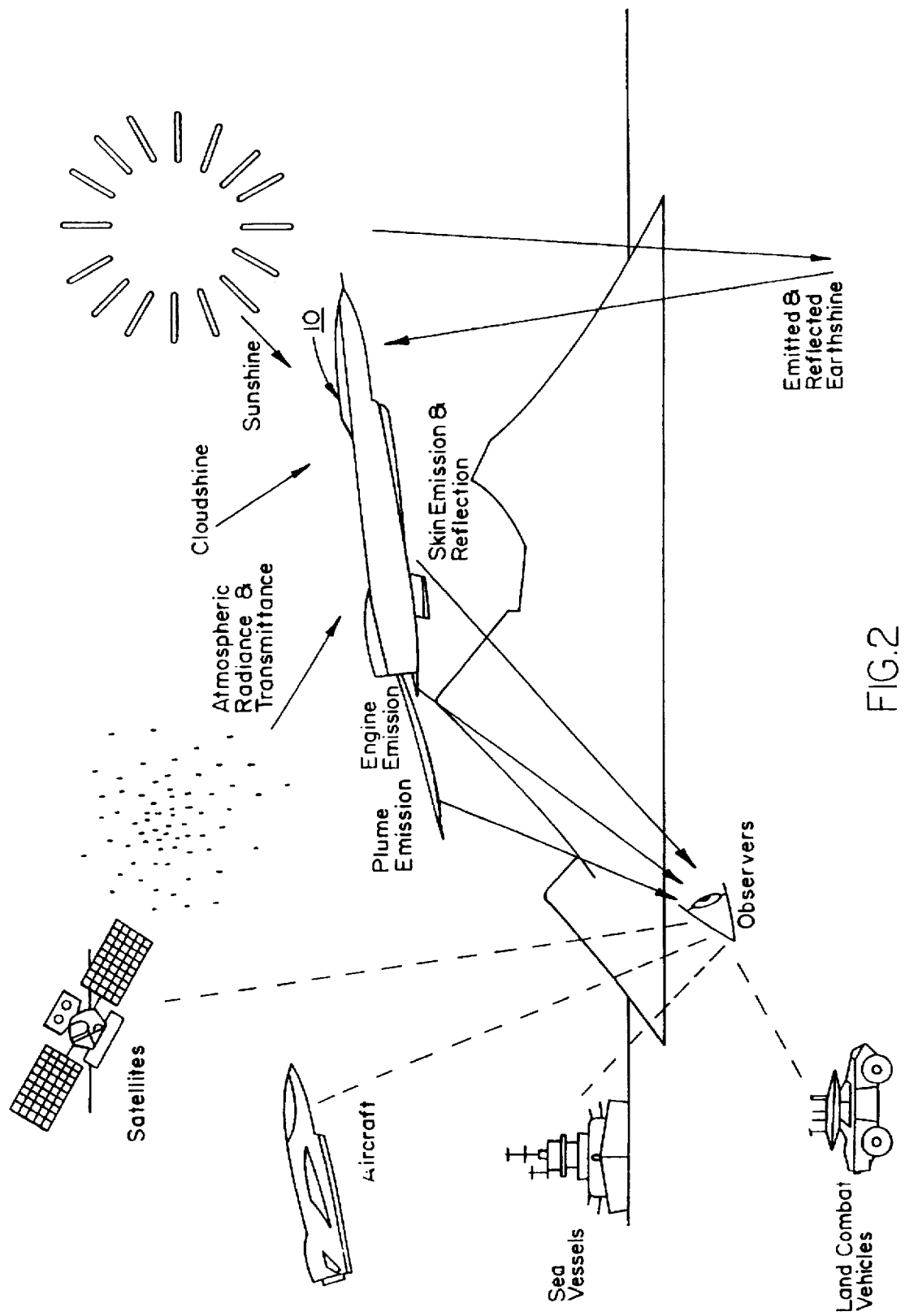
FIG. 2 illustrates a scenario representative of advantages and countermeasures derived when liquid crystals are integrated into the canopy panel structure of an aircraft cockpit.

For example, the integration of liquid crystals into the canopy, as described in further detail hereinbelow, provides numerous advantages, as shown in FIG. 2 of the drawings in a generally schematic representation of a scenario representative of conditions to which an aircraft may be exposed. Thus, for instance, the energizing of the liquid crystals to change their orientations so as to control the transmittance of electromagnetic energy from an external source or sources into the cockpit through the canopy 10 may be utilized to reduce or eliminate visual and infrared seeker lock-on ranges from satellites, aircraft or ships and also to reduce aircraft susceptibility due to plume emissions, engine emissions, aircraft skin emissions and reflections, and to reduce the environmental control system exhaust heat load of the aircraft.

Also ameliorated are effects due to and imperviousness increased with regard to atmospheric radiance and transmittance, cloud shine, sunshine (in order to eliminate solar reflections) and glint or light reflections from a pilot helmet, solar glints reflected from the canopy, and cockpit heat loads, and also concurrently to reduce environmental control system exhaust heat loads.

The foregoing reduces the vulnerability of the pilot to low/medium energy lasers and enemy lock-on by means of laser finders.

Moreover, the canopy 10 can readily be employed as a display for information processing by the pilot and eliminates the need for extensive and heavy equipment which would normally have to be located within the aircraft cockpit.

Reverting to the particular construction of the multi-layered or sandwich structure of the cockpit canopy panel or window surface 14, reference may now be had to FIG. 3 generally diagrammatically illustrating an exploded perspective view thereof.

The cockpit window or canopy panel 14 may contain an outer panel or window structure 16 which is normally of a transparent nature, and may consist be of a high-strength glass or plastic construction as is well known in the aircraft technology.

Similarly, an inner cockpit window panel 18, which is contoured to closely conform to the configuration of the outer panel 16 so as to form a sandwich structure in conjunction therewith, may also be constituted of a high-strength transparent material, as is well known in aircraft canopy construction.

Pursuant to the invention, interposed between the outer and inner canopy panels 16, 18 is a further layer 20 comprising an array of liquid crystals 22 which may be suitably embedded in a transparent film web substrate 24, and which is adhered in surface contact to the adjacently facing surfaces 26, 28 of, respectively, the outer and inner window panels 16, 18 by means of a suitable adhesive 30 so as to form a compact sandwich structure which is laminated or bonded along the peripheral edges of the canopy 10.

As illustrated in FIG. 4a in a generally diagrammatic representation, the liquid crystals may be activated or energized and resultingly oriented in various positions through the application of electrical energy or electrical current by means of a suitable switch or other control device which is actuated by the pilot, whereby with the application of the electrical current, the liquid crystal film layer 22, 24 is imbued with a generally opaque nature so as to inhibit incident electromagnetic energy or waves, such as may be generated from an external laser or energy source or the like, from being transmitted through the canopy 10 into the aircraft cockpit.

Conversely, upon the liquid crystals 22 being deenergized, such as by opening the switch to prevent electrical current from energizing the liquid crystals and again changing their orientations, incident electromagnetic waves or energy may readily pass through the canopy 10 inasmuch as the liquid crystal film web 24, and resultingly the panel structure 14, assumes a transparent nature.

In accordance with the extent of electrical energization of the liquid crystals 22, it is possible to control the degree of opaqueness of the canopy panel structure 14 and thereby the transmittance of electromagnetic energy through the canopy 10 so as to reduce or even practically eliminate the vulnerability and susceptibility of the pilot to external electromagnetic influences which may be caused by hostile radar and other energy transmissions, and which may enable an enemy to locate the aircraft due to reflections emitted from the canopy 10 or the helmet of the pilot.

Another aspect of the invention resides in that the liquid crystal-containing film web 24 may be applied over a specified area or areas of the canopy panel surface 14 and designed to form specified patterns representative of information screens, such as for theater-of-operation data or head-up data (HUD) in dependence upon control thereof by the pilot. This construction, while providing a ready and panoramic overview of the information screen on the canopy to the pilot will, concurrently, eliminate the need for voluminous equipment to be installed in the aircraft cockpit.

Moreover, the ability of the pilot for controlling the transmittance of electromagnetic energy through the canopy 10 will also simultaneously reduce the heat generated as a result of solar thermal loading and, consequently, thereby ameliorate the extent of the heat load acting on the environmental control system of the aircraft.

Another aspect resides in that the system is capable of converting laser energies, which are directed from the exterior against the canopy 10 into signals due to the energizing of the liquid crystals 22, such that the pilot in response to the generated signals may be able to determine the coordinates of the incoming laser radiation and take appropriate defensive measures against hostile laser weapons. The novel structure, in which the liquid crystals 22 are embedded in a suitable film web 24 and interposed in optimally located surface areas and suitable orientations responsive to energizing thereof, and which control transmittance of electromagnetic energy through the canopy in a clear and unambiguously advantageous manner, enables the formation of a unique system and method of control and protection to the pilot so as to reduce the vulnerability and susceptibility of the pilot to external electromagnetic influences, such as may be encountered by military or transport aircraft subject to potential hostile actions. A specific ability of the present invention resides in that the liquid crystal-containing cockpit canopy panel structure 14 can be retrofitted on existing aircraft, or incorporated into new aircraft design with a minimum of expenditure and difficulty and without having to extensively modify current manufacturing procedures.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A system for controlling the transmittance of electromagnetic energy through an aircraft cockpit canopy, said canopy including a multilayered panel structure having an outer transparent panel surface and an inner transparent panel surface enabling the passage therethrough of incident visible light; said system comprising:

a) liquid crystal means interposed between said outer and inner panel surfaces facilitating a determination over the amount of light being transmitted through said outer and inner panel surfaces; and b) means operatively connected to said liquid crystal means for controllably energizing said liquid crystal means to regulate the transmittance of electromagnetic energy through said canopy;

wherein said liquid crystal means facilitates a reduction in visible and near infrared portions of the electromagnetic energy that enters the canopy and reflects off a helmet of a pilot seated inside the canopy thereby reducing solar reflections which may be visible outside the canopy.

2. A method of controlling the transmittance of electromagnetic energy through an aircraft cockpit canopy, said canopy including a multilayered panel structure having an outer transparent panel surface and an inner transparent panel surface enabling the passage therethrough of incident visible light; said method comprising the steps of:

a) interposing liquid crystal means between said outer and inner panel structures for facilitating a determination over the amount of light being transmitted through said outer and inner panel surfaces; and b) operatively connecting said liquid crystal means to an energy source for controllably energizing said liquid crystal means to regulate the transmittance of electromagnetic energy through said canopy;

wherein said liquid crystal means facilitates a reduction in visible and near infrared portions of the electromagnetic energy that enters the canopy and reflects off a helmet of a pilot seated inside the canopy thereby reducing solar reflections which may be visible outside the canopy.

* * * * *